United States Patent
Zucker et al.

(10) Patent No.: US 11,030,768 B2
(45) Date of Patent: Jun. 8, 2021

(54) IMAGE PROCESSING FOR OCCLUDED ITEM RECOGNITION

(71) Applicant: NCR Corporation, Atlanta, GA (US)

(72) Inventors: Brent Vance Zucker, Roswell, GA (US); Adam Justin Lieberman, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 235 days.

(21) Appl. No.: 16/174,834

(22) Filed: Oct. 30, 2018

(65) Prior Publication Data

US 2020/0134855 A1   Apr. 30, 2020

(51) Int. Cl.
| | |
|---|---|
| G06T 7/73 | (2017.01) |
| G06T 7/90 | (2017.01) |
| G06T 7/13 | (2017.01) |
| G06K 9/00 | (2006.01) |
| G06Q 30/06 | (2012.01) |

(52) U.S. Cl.
CPC ............ G06T 7/73 (2017.01); G06K 9/00771 (2013.01); G06T 7/13 (2017.01); G06T 7/90 (2017.01); *G06Q 30/0601* (2013.01); *G06T 2207/20081* (2013.01); *G06T 2207/30232* (2013.01)

(58) Field of Classification Search
CPC ........... G06K 9/00771; G06K 9/00624; G06K 9/00664; G06K 9/00711; G06Q 20/20; G06Q 10/087; G06Q 30/0641; G06Q 20/12; G06Q 30/0633; G06Q 30/0601; H04N 5/247; G06T 7/73; G06T 7/90; G06T 7/13; G06T 2207/30232; G06T 2207/20081; G06T 2207/10016; G06T 2207/30196; G06T 2207/30201; G06T 2207/20084; G06T 2207/20132; G06T 7/0004; G06T 7/292; G06T 7/11; G06T 7/187; G06T 7/181; G06T 7/12; G06N 3/02–088
USPC ......................................... 382/103, 156–158
See application file for complete search history.

(56) References Cited

U.S. PATENT DOCUMENTS

| | | | | |
|---|---|---|---|---|
| 9,336,602 | B1 * | 5/2016 | Chang | ..................... G06T 17/00 |
| 10,133,933 | B1 * | 11/2018 | Fisher | .................... H04N 5/247 |
| 2018/0101955 | A1 * | 4/2018 | Varadarajan | ....... G06K 9/00335 |
| 2019/0197673 | A1 * | 6/2019 | Jung | ........................ G06T 7/248 |
| 2019/0236531 | A1 * | 8/2019 | Adato | .................. G06Q 10/087 |

(Continued)

OTHER PUBLICATIONS

Chandler, Benjamin, and Ennio Mingolla. "Mitigation of effects of occlusion on object recognition with deep neural networks through low-level image completion." Computational intelligence and neuroscience 2016 (2016). (Year: 2016).*

(Continued)

*Primary Examiner* — Geoffrey E Summers
(74) *Attorney, Agent, or Firm* — Schwegman, Lundberg & Woessner

(57) ABSTRACT

Cameras capture time-stamped images of predefined areas. Individuals and items are tracked in the images. Occluded items detected in the images are preprocessed to remove pixels associated with occluded information and the pixels remaining associated with the items are cropped. The preprocessed and cropped images are provided to a trained machine-learning algorithm or a trained neural network trained to classify and identify the items. Output received from the trained neural network provides item identifiers for the items that are present in the original images.

18 Claims, 4 Drawing Sheets

(56) References Cited

U.S. PATENT DOCUMENTS

2020/0082206 A1\* 3/2020 Jin .................. G06K 9/627
2020/0327309 A1\* 10/2020 Cheng .............. G06N 3/0445

OTHER PUBLICATIONS

Krizhevsky, Alex, Ilya Sutskever, and Geoffrey E. Hinton. "Imagenet classification with deep convolutional neural networks." Advances in neural information processing systems. 2012. (Year: 2012).*

Pal, Kuntal Kumar, and K. S. Sudeep. "Preprocessing for image classification by convolutional neural networks." 2016 IEEE International Conference on Recent Trends in Electronics, Information & Communication Technology (RTEICT). IEEE, 2016. (Year: 2016).*

Chu, Joseph Lin, and Adam Krzyżak. "The recognition of partially occluded objects with support vector machines, convolutional neural networks and deep belief networks." Journal of Artificial Intelligence and Soft Computing Research 4.1 (2014): 5-19. (Year: 2014).*

Gao, Tianshi, Benjamin Packer, and Daphne Koller. "A segmentation-aware object detection model with occlusion handling." CVPR 2011. IEEE, 2011. (Year: 2011).*

Liu, Jie. "Autonomous Retailing: A Frontier for Cyber-Physical-Human Systems." Principles of Modeling. Springer, Cham, 2018. 336-350. (Year: 2018).*

\* cited by examiner

IMAGE PROCESSING FOR OCCLUDED ITEM RECOGNITION

BACKGROUND

Computer vision and image processing techniques have advanced in recent years. However, one difficult and unsolved processing task includes item recognition.

This has been particularly difficult in frictionless store systems where a variety of situations can occlude images captured for an item. Shoppers often pass between one another and the lens of the cameras or a shopper's hand can pass between the lens and a label of the item so as to block a clear image of the item being picked up by the shopper.

These real-world problems have confounding frictionless store solutions because these situations occur more frequently than not, making frictionless stores solutions appear infeasible in the industry.

As a result, item recognition for occluded images taken of the item remains a difficult problem in the industry.

SUMMARY

In various embodiments, methods and a system for image processing for occluded item recognition are presented.

According to an embodiment, a method for image processing for occluded item recognition is presented. An image depicting an unknown item that is occluded in the image is received. The image is preprocessed to produce a modified image, which includes item pixels associated with the unknown item. A known item identifier for the unknown item is identified from the item pixels of the modified image, and the known item identifier is provided.

DETAILED DESCRIPTION

Figure 1:
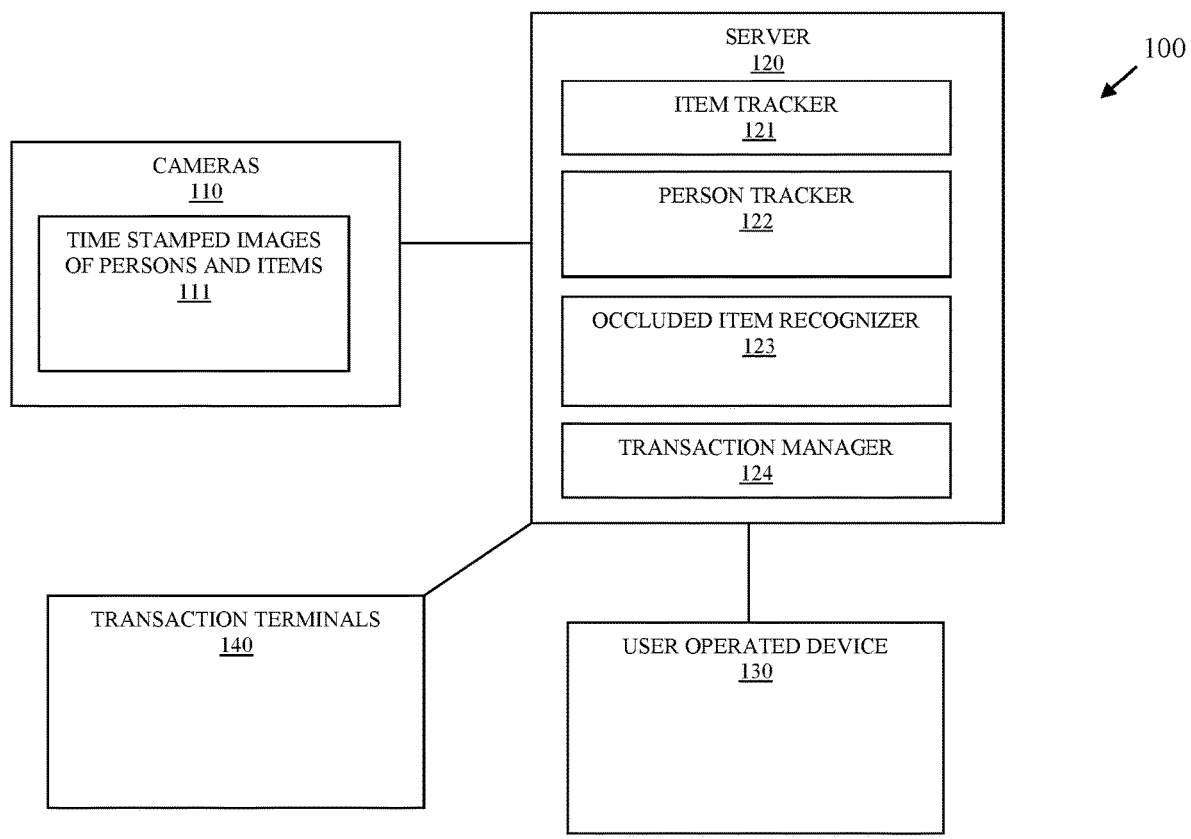
FIG. 1 is a diagram of a system for image processing for occluded item recognition, according to an example embodiment.

FIG. 1 is a diagram of a system 100 for image processing for occluded item recognition, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of image processing for occluded item recognition, presented herein and below.

As used herein and below, the terms "customer," "consumer," "shopper," and "user" may be used interchangeably and synonymously.

The system 100 includes a plurality of cameras 110 that capture time-stamped images of persons, store structures, and store items (herein after just "defined area images 111"). The system 100 may include a user-operated device 130 and one or more transaction terminals 140. The server 120 includes executable instructions that execute on one or more hardware processors of the server 120 from a non-transitory computer-readable storage medium as: an item tracker 121, a person tracker 122, an occluded item recognizer 123, and a transaction manager 124.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-124 may execute on a same server 120 or multiple different servers networked together.

When a customer enters a store or is outside the store in the parking lot, cameras 110 begin capturing the time-stamped images 111 in frames. In an embodiment, the cameras 110 capture images at a rate of 20 to 30 frames per second.

The cameras 110 are preconfigured to capture images 111 of the defined areas based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Initially, the cameras 110 are situated in locations throughout an enterprise (such as a retail store but can be other enterprises or even a consumer's home). Each camera lens configured to cover one or more predefined areas of the physical space of the enterprise.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121, the person tracker 122, and the occluded item recognizer 123. In an embodiment, some of the images when streamed from the cameras 110 can be buffered or cached in memory of cache and made accessible from the memory or cache to the item tracker 121, the person tracker 122, and the occluded item recognizer 123.

Each accessible image 111 includes its metadata (minimally including what was discussed above) with its image 111 on the server 120.

The person tracker 122 processes the pixels of the images to identify a unique person (the actual identity of the person can be unknown but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images.

The person tracker 122 uses this box in cooperation with the item tracker 121 to determine when a person within the store has picked up an item or removed an item from possession of the person while in the store.

The item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc.

In many cases, the item detected by the item tracker 121 may overlap be occluded by other pixels associated with tracked persons or limbs and hands associated with tracked persons. This permits an item identifier (known or unknown) to be assigned to a person identifier (known or unknown). However, such situations may also preclude the item tracker 121 from accurately recognizing the item and providing a proper item identifier for the tracked item that is occluded in the images 111.

Item recognition and the assignment of a known item identifier is needed for proper transaction processing by the transaction manager 124. Thus, the sooner the item tracker 121 can assign an item identifier for an unknown tracked item, the better the frictionless store system 100 can operate with acceptable response times to support transaction processing. In a frictionless store, individuals are continuously moving throughout the store, grabbing items, putting items back on shelves, until they exit the store. The item recognition has to be fast enough to capture the most-hurried shopper that is rapidly grabbing items and quickly exits the store. Therefore, quick responses times are needed by the item tracker 121, the person tracker 122, and the transaction manager 124.

To rapidly process occluded item images 111, the occluded item recognizer 123 is provided. It is to be noted that the occluded item recognizer 123 may comprise a plurality of software services/modules that cooperate together to assist the item tracker 121 in providing a proper known item identifier for an unknown item that is detected as being associated with a person identifier for a known or unknown person.

When, the item tracker 121 is unable to identify an item but is aware that an item is missing or something is in the hand of a tracked person. As stated above the item tracker 121 may use its own trained neural network or machine-learning algorithm against the occluded image 111 to initially ascertain that there is an unknown item present in the occluded image; however, the item attributes are insufficient for a determination to be made by the item tracker 121 to assign a proper known item identifier for the item.

In such situations, the item tracker 121 provides the occluded image 111 having an unknown item identifier for an unknown item to the occluded item recognizer 123.

Concurrently, the person tracker 122 is evaluating each of the images 111 including the occluded image. The person tracker 122 tracks and identifies with coordinates into the occluded image attributes assigned to the tracked person. As such, the occluded item recognizer 123 preprocesses the occluded image 111 to remove those pixels that are associated with the tracked person or tracked limbs of the person, such as pixels associated with a hand of the tracked person. Remove of pixels associated with a covering hand of tracked person can also be done by clustering the pixels in the occluded image into color buckets, the color of the hand of the tracked person falls into its own unique color cluster/bucket. The occluded item recognizer 123 changes all pixels associated with the hand or limb of the tracked person in the occluded image to black. The modified pixels of the occluded image 111 are then further normalized by scaling all pixels in the modified occluded image 111 between 0 and 1. Next, the occluded item recognizer 123 performs edge detection. This is done by grey scaling the normalized and modified pixels in the occluded image 111 in order to find the pixel values of all edges present in the occluded image 111 and all non-edge pixels not associated with the edges and not enclosed by the edges are set to black. Furthermore, the occluded item recognizer 123 continues to modify the occluded image 111 by removing all background pixels from the image 111 that are not associated with the area defined within the edges and by the edges.

The final modified version of the occluded image 111 (obtained by the preprocessing discussed above), is then passed to a trained machine-learning algorithm or a trained neural network that has been previously trained with known results (known item identifiers) from final modified versions of occluded images of items. The machine-learning algorithm or neural network provides as output a known item identifier for the unknown item that was present in the original version of the occluded image 111. The output of the machine-learning algorithm or neural network may include a list of sorted item identifiers with the highest confidence value (percentage of confidence in the assigned item identifier) being the known item identifier for the item present in the original version of the occluded image 111.

The occluded item recognizer 123 provides the known item identifier back to the item tracker 121. The item tracker 121 notifies the transaction manager 124, and if appropriate, a virtual shopping cart being maintained for a person identifier associated with the person (may be known or unknown at this point in time) is updated to include the known item identifier.

The occluded item recognizer 123 preprocesses pixels of the occluded image 111 to remove and black out all pixels present in the occluded image 111 which are unlikely to be associated with the unknown item identified by the item tracker 121. This allows the trained machine-learning or neural network to focus on just those remaining unique pixels of the occluded image 111 that are most likely only associated with the unknown item. Training allows the machine-learning algorithm or neural network to derive factors, weights, and algorithms that are focused on non-noise pixels (those pixels not associated with items) from the images 111, such that the predicted item identifiers are more accurate because a substantial amount if not all (in some instances) pixel values that the machine-learning or neural network is trained on are directly associated with known items (known item identifiers).

In an embodiment, the machine-learning algorithm associated with the item tracker 121 utilizes the known items that are known to be located in the area where the occluded image 111 was captured. This can be achieved based on the metadata associated with the cameras 110 and using the camera's known area of coverage to map to known locations for items in that coverage area (e.g., a planogram). The list of potential items associated with the occluded image 111 can be provided as further input with the final modified version of occluded image 111 produced by the preprocessing of the occluded item recognizer 123 to the machine-learning or neural network of the occluded item recognizer 123. This further improves the accuracy and response time of the machine-learning or neural network associated with the occluded item recognizer 123 by limited the available choices of items to the inputted list of items.

As stated above, once the item identifier is known for the unknown item in the occluded image 111. The transaction manager 124 is notified along with the person identifier for the person being tracked by the person tracker 124. The transaction manager 124 adds the item identifier to a virtual shopping cart maintained for the person identifier (known or unknown).

The transaction manager 124 can check out any given person in a variety of manners. When the person tracker 122 has identified a customer and the customer is pre-registered with the store and has a registered payment method, then the transaction manager can process that payment method when the person is identified by the person tracker 122 as approaching or leaving an egress point of the store. When the person tracker 122 was unable to obtain the identity of the person, the person can check out at a transaction terminal 140; the transaction manager 124 interacts with an agent process on the transaction terminal 140 and provides the shopping cart items for payment when the person tracker 122 identifies the person as being present at the transaction terminal 140. When the person (identified or unidentified) has a mobile application downloaded to the person's user device 130, the transaction manager interacts with the mobile application to present the items in the shopping cart and obtain payment from the person. Other approaches for checkout may be used as well, where the transaction manager 124 and the person tracker 122 cooperate to obtain payment for known persons (identity known) and for unknown persons (identity unknown).

The occluded item recognizer 123 provides a timelier and processor efficient mechanism for recognizing items in occluded item images 111. As a result, the frictionless store system 100 can rapidly and accurately add or remove items from a shopper's shopping cart during a frictionless transaction within a frictionless store. Heretofore, the practical issues (image occlusion) and processing speed with which item recognition was achievable has made frictionless store implementations infeasible. However, the system 100 addresses these practical issues and resolves the processing speed issues such that frictionless store implementations are feasible.

In an embodiment, the transaction terminal 140 is one or more of: A Point-Of-Sale (POS) terminal and a Self-Service Terminal (SST).

In an embodiment, the user-operated device 130 is one or more of: a phone, a tablet, a laptop, and a wearable processing device.

These embodiments and other embodiments are now discussed with reference to the FIGS. 2-4.

Figure 2:
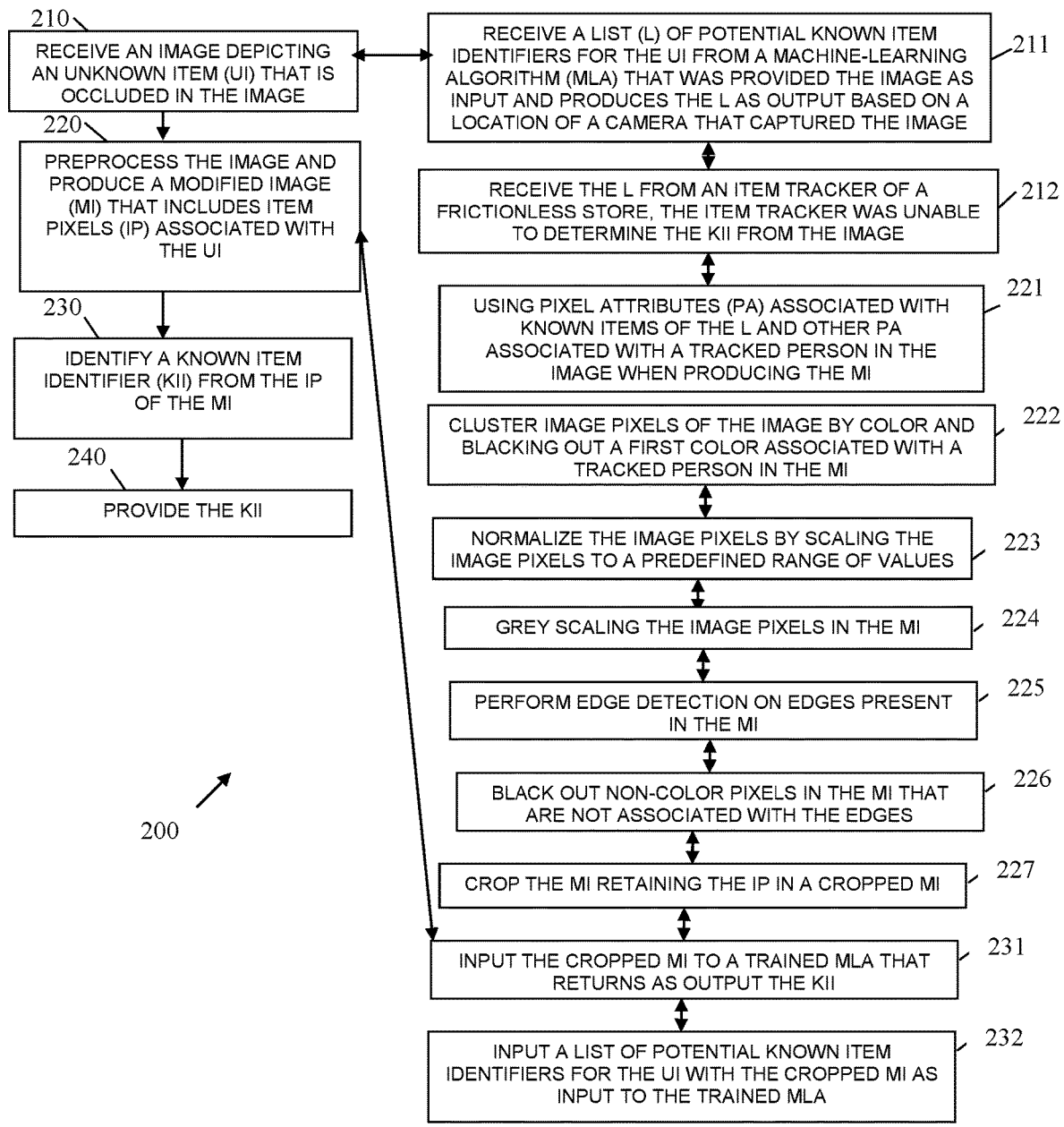
FIG. 2 is a diagram of a method for image processing for occluded item recognition, according to an example embodiment.

FIG. 2 is a diagram of a method 200 for image processing for occluded item recognition, according to an example embodiment. The software module(s) that implements the method 200 is referred to as an "item recognizer." The item recognizer is implemented as executable instructions programmed and residing within memory and/or a non-transitory computer-readable (processor-readable) storage medium and executed by one or more processors of a device. The processor(s) of the device that executes the item recognizer are specifically configured and programmed to process the item recognizer. The item recognizer has access to one or more network connections during its processing. The network connections can be wired, wireless, or a combination of wired and wireless.

In an embodiment, the device that executes the item recognizer is the server 120. In an embodiment, the server 120 is a cloud-based server.

In an embodiment, the item recognizer is all or some combination of: the item tracker 121, the person tracker 122, and the occluded item recognizer 123.

At 210, the item recognizer receives an image depicting an unknown item that is occluded in the image. That is, a clear representation of the unknown item is blocked and covered by pixels associated with an object not associated with the unknown item.

In an embodiment, at 211, the item recognizer receives a list of potential known item identifiers for the unknown item from a machine-learning algorithm that was provided the image as input and produces the list as output based on a location of a camera that captured the image.

In an embodiment of 211, at 212, the item recognizer receives the list from an item tracker of a frictionless store. The item tracker was unable to determine the known item identifier for the unknown item from the image but was able to determine that the unknown item was present or should be presented in the image.

At 220, the item recognizer preprocesses the image and produces a modified image that includes item pixels associated with the unknown item.

In an embodiment of 212 and 220, at 221, the item recognizer uses pixel attributes associated with known items of the list and other pixel attributes associated with a tracked person in the image when producing the modified image.

In an embodiment, at 222, the item recognizer clusters image pixels of the image by color and blacks out a first color associated with a tracked person depicted in the modified image.

In an embodiment of 222, at 223, the item recognizer normalizes the image pixels by scaling the image pixels to a predefined range of values (e.g., scaling between 0 and 1 as was discussed above with the FIG. 1).

In an embodiment of 223, at 224, the item recognizer grey scales the image pixels within the modified image.

In an embodiment of 224, at 225, the item recognizer performs edge detection on edges present in the modified image.

In an embodiment of 225, at 226, the item recognizer blacks out non-color pixels within the modified image that are not associated with the edges.

In an embodiment of 226, at 227, the item recognizer crops the modified image retaining the item pixels in a cropped modified image.

At 230, the item recognizer identifies a known item identifier from the item pixels of the modified image.

In an embodiment of 227 and 230, at 231, the item recognizer inputs the cropped modified image to a trained machine-learning algorithm that returns as output the known item identifier for a known item.

In an embodiment of 231, at 232, the item recognizer inputs a list of potential known item identifiers for the unknown item with the cropped modified image as input to the trained machine-learning algorithm. The list obtained based on a known location within a store that captured the image and a planogram that maps the known location to the potential known item identifiers.

At 240, the item recognizer provides the known item identifier to a frictionless store system or a security system for further processing. In an embodiment, the frictionless store system is the system 100. In an embodiment, the item recognizer provides the known item identifier to the transaction manager 124 for adding or removing the known item identifier to or from a virtual shopping cart maintained by the transaction manager 124 for a person being tracked within a frictionless store for a transaction with the person.

Figure 3:
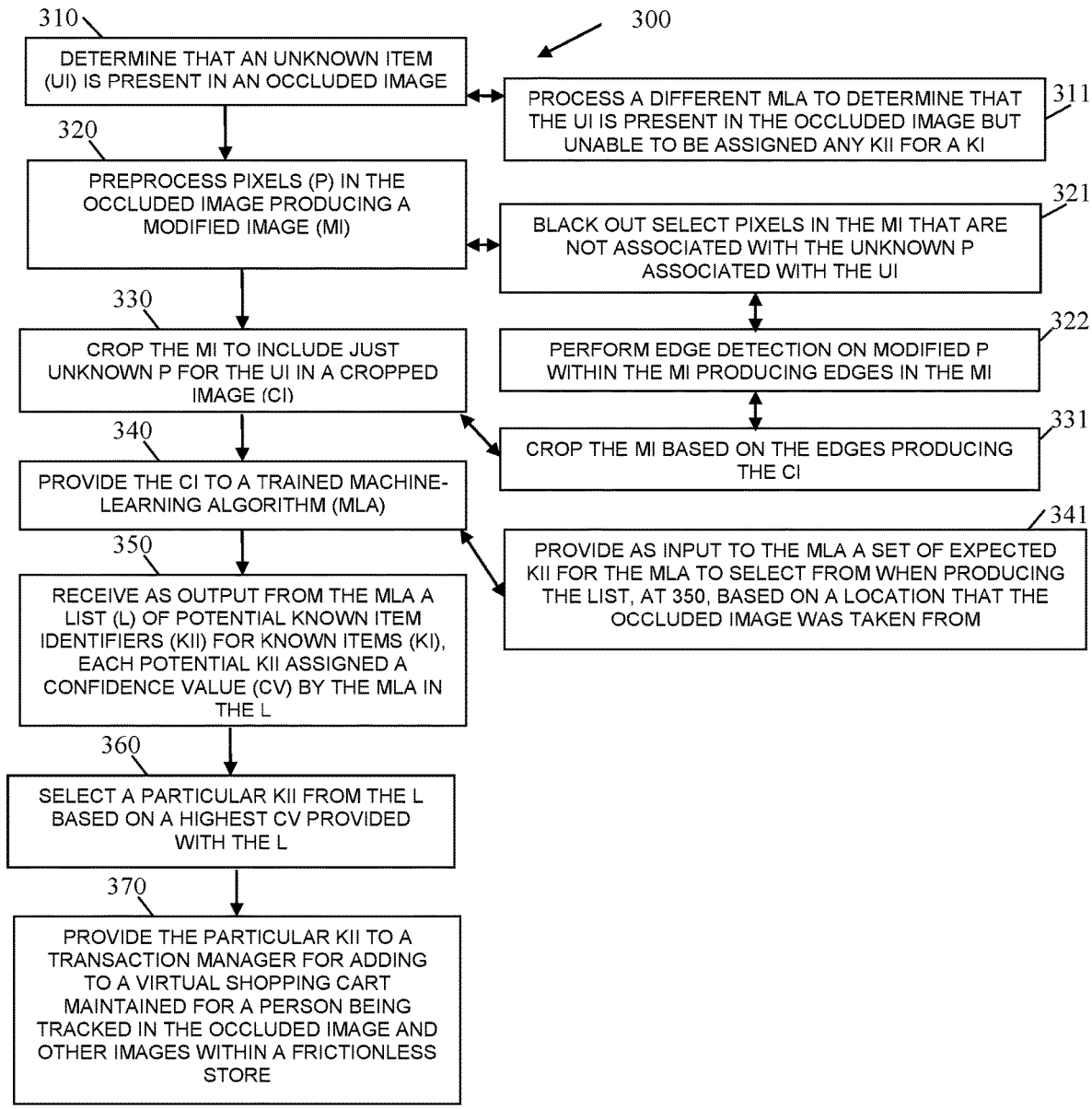
FIG. 3 is a diagram of another method for image processing for occluded item recognition, according to an example embodiment.

FIG. 3 is a diagram of another method 300 for image processing for occluded item recognition, according to an example embodiment. The software module(s) that implements the method 300 is referred to as an "occluded item recognizer." The occluded item recognizer is implemented as executable instructions programmed and residing within memory and/or a non-transitory computer-readable (processor-readable) storage medium and executed by one or more processors of a device. The processors that execute the occluded item recognizer are specifically configured and programmed to process the occluded item recognizer. The occluded item recognizer has access to one or more network connections during its processing. The network connections can be wired, wireless, or a combination of wired and wireless.

In an embodiment, the device that executes the occluded item recognizer is the server 120. In an embodiment, the server 120 is a cloud processing environment.

In an embodiment, the occluded item recognizer is all of or some combination of: the item tracker 121, the person tracker 122, the occluded item recognizer 123, and/or the method 200.

The occluded item recognizer presents another and in some ways enhanced processing perspective of the method 200 discussed above.

At 310, the occluded item recognizer determines that an unknown item is present (depicted or represented) within an occluded image.

In an embodiment, at 311, the occluded item recognizer processes a different machine learning algorithm (from the one discussed below at 340) to determine that the unknown item is present (depicted or represented) in the occluded image but unable to be assigned any known item identifier for a known item.

At 320, the occluded item recognizer preprocesses pixels in the occluded image producing a modified image.

In an embodiment, at 321, the occluded item recognizer blacks out select pixels in the modified image that are not associated with the unknown pixels of the unknown item.

In an embodiment of 321, at 322, the occluded item recognizer performs edge detection on modified pixels within the modified image producing edges in the modified image.

At 330, the occluded item recognizer crops the modified image to include or just substantially include unknown pixels for the unknown item in a cropped image.

In an embodiment of 322 and 330, at 331, the occluded item recognizer crops the modified image based on the edges when producing the cropped image.

At 340, the occluded item recognizer provides the cropped image to a trained machine-learning algorithm.

In an embodiment, at 341, the occluded item recognizer provides as input to the trained machine-learning algorithm a set of expected known item identifiers for the machine-learning algorithm to select from when producing the list (at 350 below) based on a location that the occluded image was taken from. This can be based on the metadata of the camera 110 that captured the occluded image along with a planogram that includes store locations for items of the store along with the known item identifiers associated with those items at that location (location the image was captured).

At 350, the occluded item recognizer receives as output from the trained machine-learning algorithm a list of potential known item identifiers for known items. Each potential known item identifier assigned a confidence value by the trained machine-learning algorithm in the list.

At 360, the occluded item recognizer selects a particular known item identifier from the list based on that particular known item identifier having a highest confidence value within the provided list.

At 370, the occluded item recognizer provides the particular known item identifier to a transaction manager for adding to a virtual shopping cart maintained for a person being tracked within the occluded image and other images within a frictionless store. In an embodiment, the frictionless store utilizes system 100 and the transaction manager is the transaction manager 124.

Figure 4:
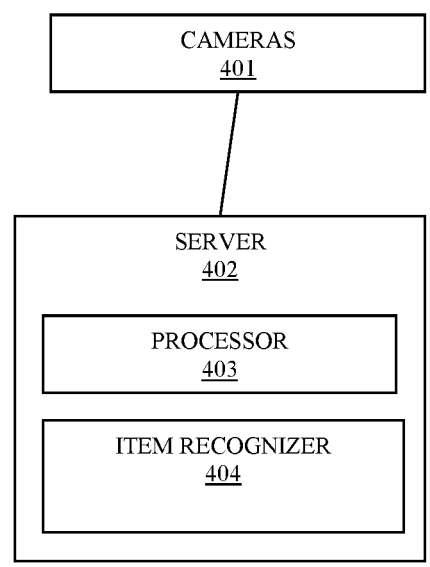
FIG. 4 is a diagram of a system for image processing for occluded item recognition, according to an example embodiment.

FIG. 4 is a diagram of a system 400 for image processing for occluded item recognition, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the server 120 and the cameras 110.

In an embodiment, system 400 is the cameras 110 and the server 120.

The system 400 includes a plurality of cameras 401 and a server 402. The server 402 includes at least one hardware processor 403 and configured to execute executable instructions from a non-transitory computer-readable storage medium as an item recognizer 404.

The item recognizer 404 when executed from the non-transitory computer-readable storage medium on the processor 403 is configured to: preprocess an occluded image that depicts an unknown item to produce a modified image having unknown item pixels; pass the modified image to a machine-learning algorithm as input; receive as output from the machine-learning algorithm a known item identifier for a known item represented in the occluded image; and provide the known item identifier to a transaction manager that maintains a virtual shopping cart for a tracked person within a frictionless store for processing with a transaction.

In an embodiment, the transaction manager is the transaction manager 124.

In an embodiment, the item recognizer 404 is all of or some combination of: the item tracker 121, the person tracker 122, the occluded item recognizer 123, the method 200, and/or the method 300.

In an embodiment, the item recognizer 404 is further configured to remove pixels from the occluded image that are not associated with the unknown item pixels and crop out just the unknown item pixels as the modified image.

In an embodiment, the systems 100 and 400 and the methods 200 and 300 are deployed as a portion of a frictionless store implementation where customers (individuals) shop through computer-vision and image processing and items and individuals are associated with one another with a virtual shopping cart maintained for each individual. Each individual can checkout and pay for his/her shopping cart items using any of the above-referenced techniques discussed with the FIG. 1.

In an embodiment, the systems 100 and 400 and the methods 200 and 300 are deployed as a portion of a security implementation that monitors individuals and objects within a predefined space utilizing computer-vision and image processing as discussed herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    receiving an image depicting an unknown item that is occluded in the image;
    preprocessing the image and producing a modified image that includes item pixels associated with the unknown item, wherein the preprocessing further includes clustering the item pixels of the image by color and blacking out a first color associated with a tracked person in the modified image;
    identifying a known item identifier for the unknown item from the item pixels of the modified image; and
    providing the known item identifier.

2. The method of claim 1, wherein the receiving further includes receiving a list of potential known item identifiers for the unknown item with the image, wherein the receiving of the list is received from a machine-learning algorithm that was provided the image as input and produces the list as output based on a location of a camera that captured the image.

3. The method of claim 1, wherein the receiving further includes receiving a list of potential known item identifiers for the unknown item with the image from an item tracker of a frictionless store system, wherein the item tracker was unable to determine the known item identifier from the image.

4. The method of claim 3, wherein the preprocessing further includes using pixel attributes associated with known items of the list and other pixels attributes associated with the tracked person in the image when producing the modified image.

5. The method of claim 1, wherein the clustering further includes normalizing the item pixels by scaling the item pixels to a predefined range of values in the modified image.

6. The method of claim 5, wherein the normalizing further includes grey scaling the item pixels in the modified image.

7. The method of claim 6, wherein the grey scaling further includes performing edge detection on edges identified in the modified image.

8. The method of claim 7, wherein the performing further includes blacking out non-color pixels in the modified image that are not associated with the edges.

9. The method of claim 8, wherein the blacking out further includes cropping the modified image retaining the item pixels in a cropped modified image.

10. The method of claim 9, wherein the identifying of the known item identifier further includes inputting the cropped modified image to a trained machine-learning algorithm that returns as output the known item identifier.

11. The method of claim 10, wherein the inputting further includes inputting a list of potential known item identifiers for the unknown item with the cropped modified image as input to the trained machine-learning algorithm.

12. A method, comprising:
    determining that an unknown item is present in an occluded image;
    preprocessing pixels in the occluded image producing a modified image, wherein the preprocessing further includes clustering image pixels of the image by color and blacking out a first color associated with a tracked person in the modified image;
    cropping the modified image to include just unknown pixels for the unknown item in a cropped image;
    providing the cropped image to a trained machine-learning algorithm;
    receiving as output from the trained machine-learning algorithm a list of potential known item identifiers for known items, each potential known item identifier assigned a confidence value by the machine-learning algorithm in the list;
    selecting a particular known item identifier from the list based on a highest confidence value provided with the list; and
    providing the particular known item identifier to a transaction manager for adding to a virtual shopping cart maintained for the person being tracked in the occluded image and other images within a frictionless store.

13. The method of claim 12, wherein the determining further includes processing a different machine learning algorithm to determine that the unknown item is present in the occluded image but unable to be assigned any known item identifier for a known item.

14. The method of claim 12, wherein the blacking out further includes performing edge detection on modified pixels within the modified image producing edges within the modified image.

15. The method of claim 12, wherein the cropping further includes cropping the modified image based on the edges identified in the occluded image.

16. The method of claim 12, wherein the providing further includes providing as input to the trained machine-learning algorithm a set of expected known item identifiers for the trained machine-learning algorithm to select from when producing the list based on a location that the occluded image was taken from.

17. A system, comprising:
cameras configured to capture images within a store;
a server that includes a processor;
the processor configured to execute executable instructions from a non-transitory computer-readable storage medium as an item recognizer;
the item recognizer when executed on the processor causes the processor to perform operations, comprising:
preprocessing an occluded image that depicts an unknown item to produce a modified image having unknown item pixels, wherein the preprocessing further includes clustering the unknown item pixels of the image by color and blacking out a first color associated with a tracked person in the modified image;
passing the modified image to a machine-learning algorithm as input;
receiving as output from the machine-learning algorithm a known item identifier for a known item represented in the occluded image; and
providing the known item identifier to a transaction manager that maintains a virtual shopping cart for the tracked person within a frictionless store for processing with a transaction.

18. The system of claim 17, wherein the executable instructions associated with the preprocessing further cause the processor to perform additional operations comprising: removing pixels from the occluded image that are not associated with the unknown item pixels and cropping out just the unknown item pixels as the modified image.

* * * * *